United States Patent [19]
McConaghy et al.

[11] Patent Number: 4,855,080
[45] Date of Patent: Aug. 8, 1989

[54] METHOD FOR DECONTAMINATING SPECIALLY SELECTED PLASTIC MATERIALS WHICH HAVE BECOME RADIOACTIVELY CONTAMINATED, AND ARTICLES

[75] Inventors: William J. McConaghy, San Jose, Calif.; James M. Wallace, Gainesville, Ga.

[73] Assignee: Nutech, Inc., San Jose, Calif.

[21] Appl. No.: 203,419

[22] Filed: Jun. 7, 1988

[51] Int. Cl.⁴ .......................... G21F 9/08; G21F 9/16; C02F 1/42; B01D 11/00

[52] U.S. Cl. .................................... 252/626; 210/660; 210/663; 210/682; 210/749; 210/638; 252/628; 252/631; 423/6; 423/8; 423/DIG. 14

[58] Field of Search ................... 252/626; 423/4, 6, 8, 423/11, 3; 134/2, 3, 4, 10, 22.14, 22.19, 22.13, 22.17; 210/660, 663, 682, 749, 298, 323.1; 26/348, 638, 639

[56] References Cited

U.S. PATENT DOCUMENTS

| | | | |
|---|---|---|---|
| 2,839,357 | 6/1958 | Clark et al. | 423/6 |
| 2,905,525 | 9/1959 | Dawson | 423/6 |
| 3,954,654 | 5/1976 | Bernard | 252/631 |
| 4,275,037 | 6/1981 | Friedland et al. | 423/8 |
| 4,293,438 | 10/1981 | Ledebrink et al. | 252/631 |
| 4,332,776 | 6/1982 | Stana | 423/10 |
| 4,350,620 | 9/1982 | Hartinger et al. | 252/631 |
| 4,478,804 | 10/1984 | Watanabe et al. | 423/8 |
| 4,642,186 | 2/1987 | Nakamura | 252/627 |
| 4,659,551 | 4/1987 | Kolarik et al. | 423/8 |
| 4,770,783 | 9/1988 | Gustavsson et al. | 210/638 |

*Primary Examiner*—Howard J. Locker
*Attorney, Agent, or Firm*—Fliesler, Dubb, Meyer & Lovejoy

[57] ABSTRACT

A method 20 for decontaminating specially selected plastic materials comprised of polymers and copolymers of unsaturated organic acids and other specially selected plastic materials, which have become radioactively contaminated, includes dissolving such plastic materials in an aqueous solvent 34 and treating the resulting solution selectively via filtration 36, ion-exchange absorption 40, and precipitation 44 processes to remove particulate and dissolved radioactive contaminants. The treated aqueous stream may be discharged to a sewage stream and the separated plastic materials can be disposed of in a sanitary landfill or recycled into other plastic products.

28 Claims, 3 Drawing Sheets

METHOD FOR DECONTAMINATING SPECIALLY SELECTED PLASTIC MATERIALS WHICH HAVE BECOME RADIOACTIVELY CONTAMINATED, AND ARTICLES

FIELD OF THE INVENTION

The present invention is directed to a method for decontaminating plastic materials which are used as disposable protective surfaces in an environment where the plastic materials can become radioactively contaminated.

BACKGROUND OF THE INVENTION

The nuclear power industry, medical institutions, DOE facilities, and research and academic institutions generate a considerable quantity of low level dry radioactively contaminated trash (low level dry active waste) each year. A good percentage of this trash consists of plastic material or material which could be replaced by plastic. Currently, such plastic material which is of a sufficiently low activity level is disposed of by shallow land burial in a controlled facility designed for such waste disposal. Such disposal facilities have become increasingly unpopular, and as a result of the strict regulations regarding the design and operation of such facilities, the cost of burial has escalated tremendously in recent years. Therefore, many strategies and techniques have been devised to incinerate, compact, or otherwise reduce the volume of material which must be disposed of at such low level waste burial facilities.

Plastic materials which are subject to becoming contaminated in the above environment range widely from clothing used to protect personnel, to cloths, drapes and coatings used to protect walls, floors, structures and equipment, and to actual structural elements and equipment.

The methods currently employed for reducing the volume of dry active waste include: (1) Compaction and Supercompaction, (2) Incineration, (3) Segregation, and (4) Miscellaneous washing or laundering processes.

The compaction and segregation processes attempt to physically reduce the volume of a given quantity of waste by the application of high pressure or by segregating individual pieces of the waste which can be identified as having an acceptably low level of radioactivity so as to be considered releasable to the environment.

The incineration process attempts to reduce the volume of waste by oxidizing all of the combustible components in the waste, thereby leaving a condensed and concentrated residue. The washing and laundering processes are used primarily for clothing materials as a method for reducing the contamination levels between uses. Some attempts have been made to launder plastic materials prior to disposal, however, these attempts have met with little success as regards to significant volume reduction.

Much knowledge of the characteristics of dry active waste is available in the literature. Characteristics which are of importance in devising a disposal method include (1) isotope composition, (2) particle size distribution, (3) soluble/insoluble proportions, and (4) chemical forms.

Due to the shipping and burial requirements for radioactive material, a great deal of isotopic distribution data is available in the literature. Although the numbers vary widely from year to year and from plant to plant, the predominant isotopes which account for the majority of the activity are Co-58 and Co-60 (Cobalt isotopes), Fe-55 (Iron isotopes) and Cs-134 and Cs-137 (Cesium isotopes). Cobalt-60 alone generally account for 40%–60% of the activity and is by far the most important contributor. Most of these isotopes are found in the form of salts and particulate oxides.

Further data shows that the particle size generally ranges from 0.1 to 5 microns. Of the identified isotopes the cobalt isotopes are generally insoluble while the cesium isotopes are generally soluble.

SUMMARY OF THE INVENTION

The present invention is directed toward solving the outstanding problem of reducing the volume of dry plastic active waste which must presently be buried in a licensed waste disposal facility.

The present invention utilizes the dissolution of the contaminated plastic materials in order to separate the radioactive material from the substrate plastic material. Dissolution occurs in an aqueous solvent and the plastic materials are specially selected in order to be rapidly dissolved.

Following dissolution, the effluent steam is operated on in order to segregate contaminants from the plastic materials in order to be able to dispose of the contaminants at a special burial site in an efficient manner with a reduced volume. The plastic material can then be disposed of conventionally or reprocessed into other plastic product for reuse.

Accordingly an object of the present invention is directed to a method of decontaminating plastic materials which have become radioactively contaminated in order to reduce the volume of material which must be disposed of by shallow land burial.

Another object of the present invention is to provide a method for treating contaminated plastic material to reduce the contamination level on the plastic material.

Still another object of the present invention is to provide a method for treating contaminated plastic materials to remove the radioactive substances from the plastic material such that the plastic material is suitable for reuse.

Another object of the invention is to select appropriate plastic materials that are readily dissolved in an aqueous solution such that the resulting effluent stream can be operated on in order to segregate contaminants from the plastic materials.

Another object is to provide for appropriate articles, coatings and the like to be made from the specially selected plastic material.

DETAILED DESCRIPTION OF THE PREFERRED EMBODIMENT

Figure 1:
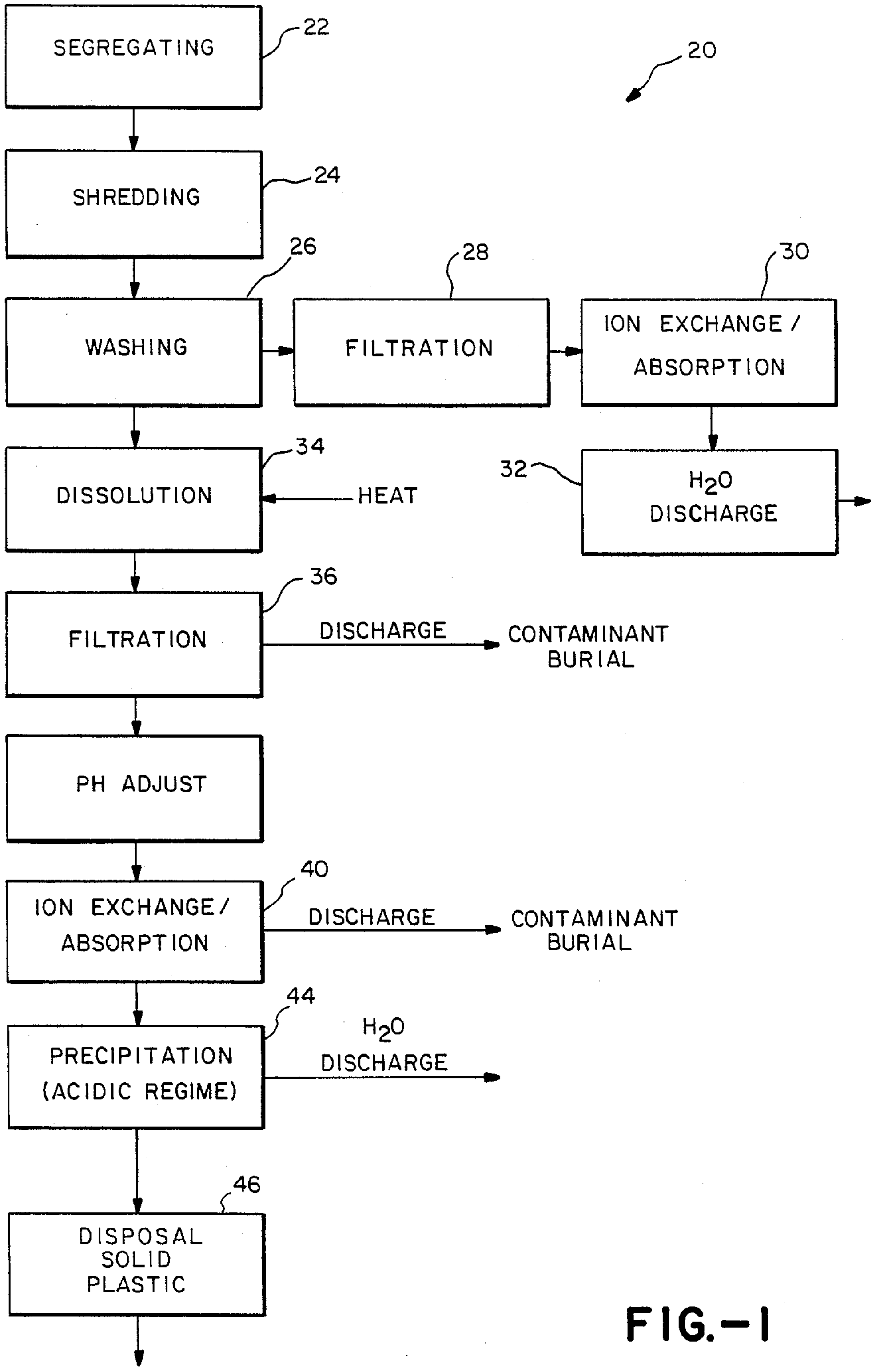
FIG. 1 depicts an embodiment of the decontamination process of the invention.

An embodiment of the method of the invention is depicted in FIG. 1 and denoted by the number 20. The method contemplates the use of specially selected plastics for use in clothing, coverings, structures and equipment meant to be used where such plastics will become radioactively contaminated. The method so contemplates, in a preferred embodiment, plastics that are soluble in aqueous solutions. In a preferred embodiment said plastics can comprise a copolymer of ethyl acrylate and methacrylic acid which has physical properties similar to those of conventional plastics such as polyvinylchloride or polyethylene films which are widely used in the nuclear industry for sheathing, personnel clothing, plastic bags, lay-down cloth and the like.

In a preferred embodiment the composition of the copolymer can include, by way of example only, ratios of 4:1, 3:1, 2:1, and 3:2 of ethylacrylate and methacrylic acid respectively.

It is to be understood that other plastic materials which are soluble in aqueous solvent can be used with the method of the invention. For example polyvinylalcohol (PVOH) has similar properties and can be so used in the method of the invention. Polyvinylalcohol, however, has the drawback that it is readily dissolved in an aqueous solution at any time. Thus dissolution could take place prior to when dissolution and subsequent disposal are desired.

A discussion of such plastics that are dissolvable in aqueous solutions can be found in the following references, which are incorporated herein by reference:

| Inventor Issue Date | Number | Title |
|---|---|---|
| Belz Sept 4, 1984 | U.S. Pat. No. 4,467,728 | Composite Foil Particularly A Toilet Seat Support, as Well as Process |
| Belz Apr 14, 1981 | U.S. Pat. No. 4,261,066 | Toilet Seat Cover |
| Belz Oct 5, 1982 | U.S. Pat. No. 4,352,214 | Toilet Seat Cover |
| Belz Nov 5, 1985 | U.S. Pat. No. 4,551,369 | Composite Packaging Material & Process for Making Same |
| Belz July 9, 1985 | Canada Pat. 1,190,014 | Composite Foil |

Generally appropriate plastics are copolymers of unsaturated, organic acids such as acrylic acid, methacrylic acid and particularly maleic acid anhydride. Due to their flexible properties, particular reference is made to copolymers of maleic anhydride and ethyl vinyl ethers, particularly those produced in a ratio of 1:1. Reference is also made to copolymers of maleic anhydride and methacrylate, terpolymers of maleic anhydride, methacrylate and butyl acrylate, as well as copolymers of methacrylic and acrylic acid, especially copolymers of acrylic acid and methacrylate. Additionally hydroxy propyl cellulose can be used.

For purposes of the method 20 of the invention, the specially selected plastic materials that are dissolvable in an aqueous solution are in a preferred embodiment distinctly marked as to be readily identifyable from other plastic materials used in a nuclear power plant environment. An initial step in the method 20 is that of segregating conventional plastics and other materials and specially selected and marked plastics at segregating step 22 of the method 20.

Once the specially selected plastic is segregated, it can be shredded as represented at shredding step 24 in order to enhance the efficiency of the remaining method 20 of the invention.

The next step is the washing step 26. At washing step 26 the shredded plastic material is spray washed with a neutral or acidic solution in order to remove any of the loosely attached soluble and insoluble radioactive contaminants from the plastics. The resultant effluent stream can then be treated by filtration step 28 and ion exchange or adsorption step 30 to remove enough of the radioactive contaminant as to make the effluent stream environmentally acceptable for release at step 32. The contaminant removed by filtration step 28 and ion exchange or adsorption step 30 can then be buried in a site suitable for burying low level contaminants. It is to be understood that particulars of the filtration step 28 and the ion exchange or adsorption step 30 are similar to the filtration and ion exchange or adsorption steps described below which form part of method 20.

The washed plastic is subsequently dissolved at step 34 in an aqueous solvent which in a preferred embodiment includes a caustic solvent. Heat is preferrably added to enhance the rate of dissolution and to aid in the digestion of cobalt particulate.

The effluent stream from this stage is subject to one or more filtration operations at step 36 depending on the nature of the waste stream. The filtration stages in step 36 are intended to remove all insoluble material down to the sub-micron size and in so doing remove a significant portion of the radioactive material form the waste stream. The discharge from the filtration step 36 includes a filtered effluent stream and periodically the solid material captured by the filter device. This solid discharge may be disposed of in a licensed nuclear waste disposal facility. The solid discharge is generally in the form of insoluble and particulate contaminants.

After the filtration step 36, the pH of the effluent stream may be adjusted prior to an ion-exchange/adsorption step 40. The ion-exchange/adsorption step 40 will remove the soluble portion of the radioactive contaminants which were not previously removed. The discharge from the ion exchange step 40 includes the treated effluent stream, and periodically the solid ion exchange or adsorption media utilized in the step 40. This material can be dewatered or otherwise treated or contained in order to make it suitable for disposal in a licensed nuclear waste facility. The solid discharge is generally in the form of soluble contaminants and some insoluble contaminants not removed by the filtration step.

Examples of appropriate ion exchange/adsorption media can be acquired through DURATEK Corporation of Greenbelt, Md. Durasil 70, Durasil 190 and Durasil 230 are tradenames of such media.

Subsequent to ion-exchange treatment, the effluent stream is monitored for activity level and could potentially be discharged to an effluent stream or biological treatment system. Otherwise, this stream will be treated to remove the plastic from the waste stream and then dischanged to an effluent stream. The plastic is removed from the waste stream by a precipitation reaction (step 44) utilizing the insolubility of the plastic polyelectrolyte in an acidic regime. Once the solution is acidified, the plastic will precipitate out of solution and can be separated from the solution by filtration or other dewatering techniques. The product plastic can be dried and either disposed of as clean waste or recycled into other thermoplastic products (step 46).

The disposable items from the above method 20 include in addition to contaminants, contaminated filtration and ion-exchange media which can be dewatered and incorporated into a solid matrix for shallow land burial or can be placed in a high integrity container (HIC) for similar disposal.

DRY ACTIVE WASTE CHARACTERIZATION

The predominant species are cobalt and cesium, the cobalt resulting from activation of structural materials and corrosion products and the cesium from poor fuel performance. The cobalt is anticipated to be present in both soluble and insoluble forms with the insoluble particulate having a wide range of particle size. The cesium is expected to be essentially 100% soluble.

EXAMPLE

A plastic which is comprised of a 3:1 copolymer of ethyl acylate and methacrylic acid is used in this example. This plastic has physical properties similar to those of conventional polyvinylchloride or polyethylene film, and can be used in nuclear power facilities for a variety of purposes, some of which include sheathing, personnel clothing, plastic bags, and laydown cloth. Once contaminated, this material is segregated from other plastic materials, shredded and washed, then dissolved in a 1N NaOH solution. Low heat addition during the dissolution process will increase the rate of dissolution such that a 3% solution of polymer can be achieved in approximately 30 minutes. The solvent can be preheated for most rapid dissolution. The heat addition process also aids in the formation of insoluble metal ion precipitates such as $Co(OH)_2$ which can be subsequently removed by filtration. This digestion is governed by the reaction:

$$Co_{(aq)}^{+2} + 2OH_{(aq)}^{-1} \rightarrow Co(OH)_{2(s)}$$

The reaction with cobalt is used as an example because the cobalt isotopes Co-58, and Co-60 constitute the vast majority of the radioactivity in low level dry active waste streams.

DISSOLUTION REACTION

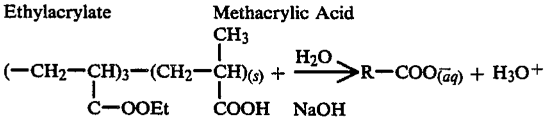

After the dissolution and digestion processes, the plastic waste stream is pumped through a filtration stage which consists of one or more individual filtration units of different pore sizes or media types. This stage removes the insoluble and particulate portion of the waste stream, while allowing the plastic to continue downstream. A decontamination factor between 5 to 10 can be achieved from the filtration stage alone. Subsequent to filtration, the waste stream is passed through an ion-exchange stage which may consist of mixed beds or serial beds of different media. Ion-exchange media are which are selective for cobalt and cesium with a low specificity for common ions such as sodium are the preferred media. Some examples includes Durasil-70, Durasil-190, and Durasil-230, all of which are products of Duratek Corporation. This ion-exchange stage removes to a high degree the specific metal ions which are responsible for the majority of the activity in the stream and for which the ion-exchange media have been selected. Decontamination factors on the order of one hundred (100) or greater can be acheived. After ion-exchange, the waste stream must be acidified using, for example, hydrochloric acid, in order to precipitate the polymer from solution. This precipitate is filtered or dewatered using a device such as a centrifugal decanter or similar polymer filtering device, then extruded into a form suitable for drying. The plastic can then be disposed of or recycled into reusable plastic products. The effluent liquid from the precipitation and filtering stage may be discharged to the environment at a properly licensed facility.

DISSOLUTION TESTS

Tests have been performed to characterize the dissolution properties of the two plastic materials, copolymers of ethylacrylate and methacrylic acid.

With ratios of 4:1 and 3:1, respectively, the 3:1 copolymer has dissolved faster and with more clarity than the 4:1 under all conditions tested. Solvents tested include:

AQUEOUS SOLVENTS

1% NaOH
4% (1N) NaOH
5% $Na_2CO3$
1N $NH_4OH$

The most rapid dissolution rate has been observed with (1N) $NH_4OH$; however, this solvent has not been pursued due to its potentially hazardous nature and more importantly due to its interference with cobalt removal. The most promising solvent is 4% (1N) NaOH. Dissolution rates with low heat additon range from 1.3–2.0 g/liter.min and result in clear solutions which although viscous, are filterable.

ION EXCHANGE

Cs Removal

3% w/w solutions of plastic containing 20 ppm Cs in 1N NaOH showed no sign of breakthrough after 600 bed volumes with Durasil 190 and 230 media. This means a minimum of 7 Kg of plastic can be processed with 1 liter of the media.

Co Removal

The high pH generated by dissolution in 1N or 1% NaOH causes precipitation of Co in solution. The precipitation process requires time for the particles to agglomerate. In early experiments where this time was not allowed, Co removal appeared very poor, most likely because fine precipitated Co(OH)2 passed through the column. An experiment where a 1% plastic, 1% NaOH, 20 ppm Co solution was allowed to stand for 24 hours, filtered and then passed through a Durasil 70 media Co column gave excellent results. Eighty percent of this Co came out on the filter. After 300 bed volumes, there was no sign of Co breakthrough in the test column. Thus, a minimum of 3 Kg of plastic can be processed of 1 liter of the media.

Industrial Applicability

Cobalt and Cesium are expected to be the major contaminants which will be removed by the method 20 of the invention.

The method of the invention can be used in several manners. The method can be built into the operation of any particular and desired nuclear power plant. Further the method can be provided on a portable facility so that it may be selectively positioned at a nuclear power plant site for periodic processing of the required plastics. Further the method can be established in a central facility and the plastics shipped to the central facility from a number of regional locations.

Figure 2:
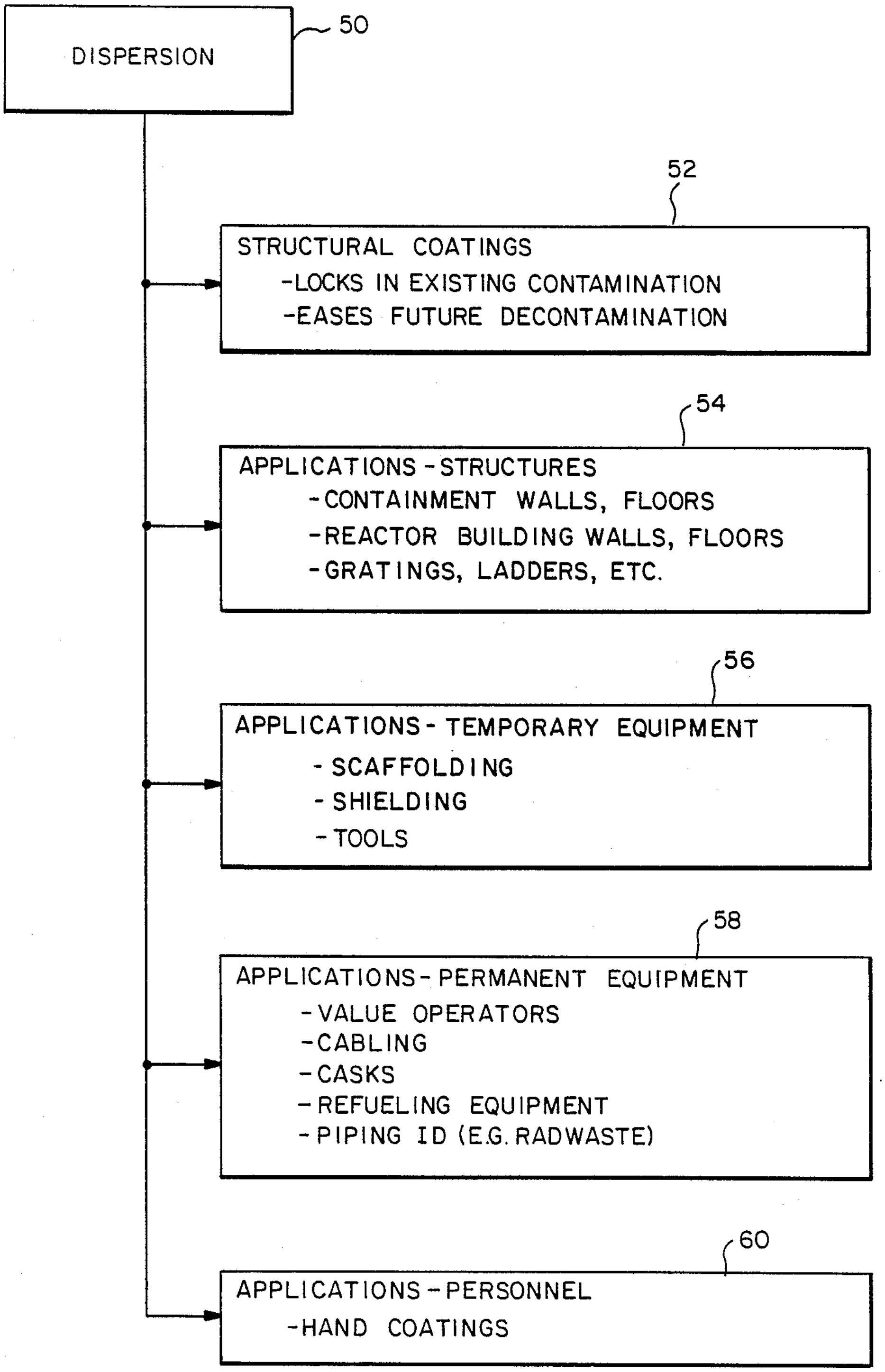
FIGS. 2 and 3 depict embodiments of the process and articles of the invention.
Figure 3:
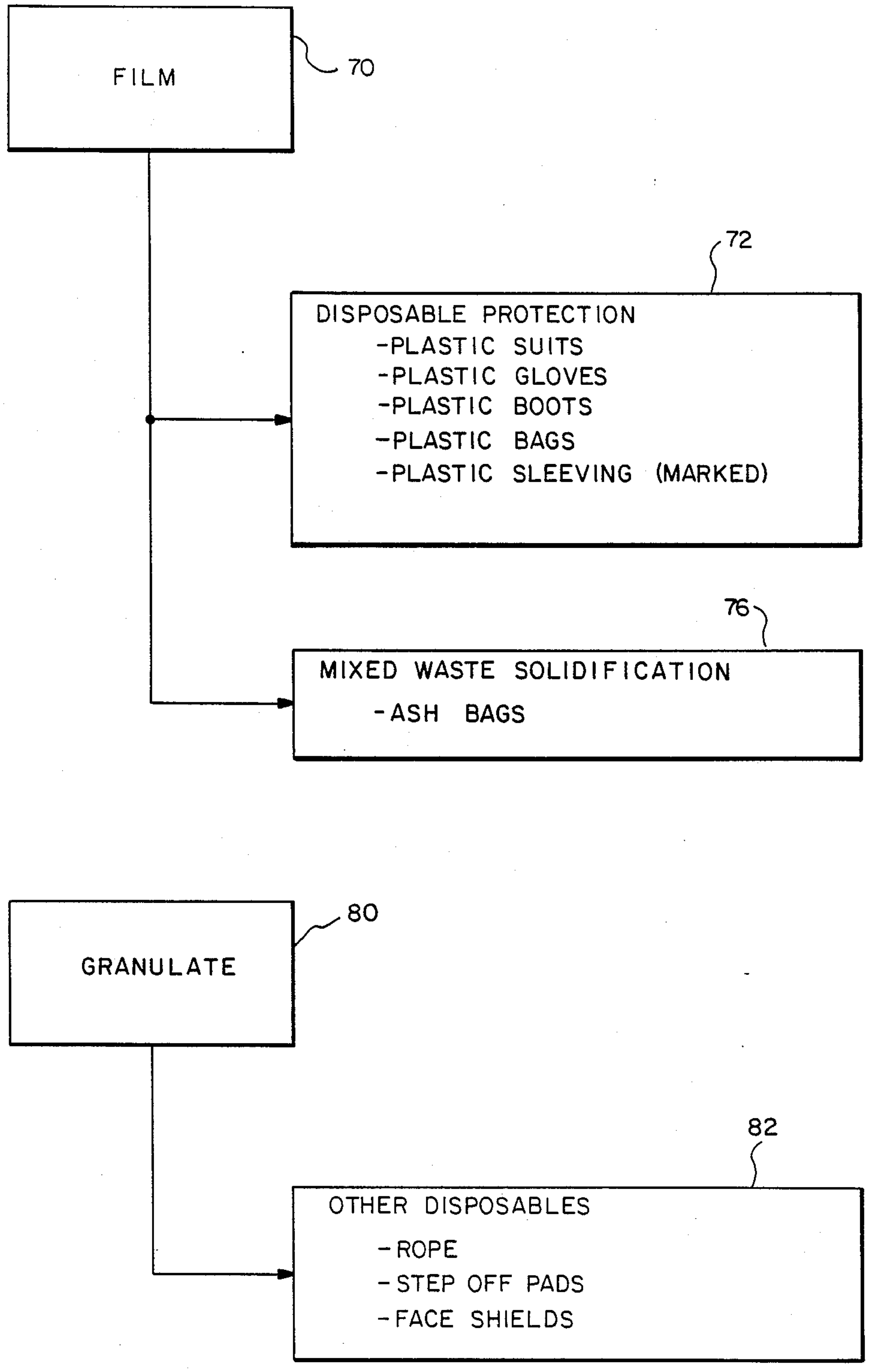

The invention further encompasses the production and fabrication of a number of articles which can be processed according to the method 20. As can be seen in FIG. 2, the invention includes the use of a dispersion 50 of plastic materials as identified above which are soluble in aqueous solutions for structural coatings 52 which can lock in existing contamination and which can ease future decontamination procedures. Further dispersion 50 can be applied initially and directly to structures 54 such as containment walls and floors, reactor walls and floors and gratings and ladders. Additionally, temporary equipment 56 such as scaffolding, shielding and tools can be covered by the dispersion. Further, permanent equipment 58 such as valve operators, cabling casks, refueling equipment and piping can be covered with a dispersion of a plastic material which is soluble in an aqueous solution. Additionally, dispersions can be used selectively to protect personnel 60 such as, for example, in hand coatings.

Additional uses of the invention can be made by placing the plastic material in the form of a film 70. Such film 70 can be used as disposable protection 72 as plastic suits, gloves, boots, bags, sleevings, laydown cloths, and drapes and the like. Further such plastic film can be used for bags 74 for containing waste products. A granulate form 80 of the plastic materials as identified above, can be used for producing other disposals 82 such as rope, step-off pads and face-shields.

From the above, it can be seen that the present invention is directed to a method and articles which have significant advantage in the nuclear power industry. Such invention allows for appropriate protection from contamination while easing the problem of disposal and storage of the contaminated plastic materials. The plastic materials according to the invention are processed by the method of the invention by dissolution in an aqueous solution with the contaminants removed and buried, and the plastic, recycled and reformed again into items used for protection in the nuclear environment.

Other objects and advantages of the invention can be obtained through a review of the claims and the Figures.

It is to be understood that other embodiments of the invention can be devised which come within the scope and breadth of the claims appended hereto.

We claim:

1. A method for disposing of plastic materials formed into articles for use in an environment having radioactive materials and contaminants, which plastic materials have become radioactively contaminated due to exposure in such environment, comprising the steps of:

selecting as the plastic materials a copolymer of an unsaturated organic acid;

dissolving the plastic materials in an aqueous solvent to produce an effluent stream;

providing for, selectively using one of an ion exchange and an adsorption step whereby the soluble materials, at least some of which are radioactively contaminated, are removed from the effluent stream;

disposing of the soluble materials as radioactively contaminated materials;

discharging the effluent stream selectively by one of reusing the plastic materials and disposing of the plastic materials as non-radioactive contaminated waste.

2. The method of claim 1 after the dissolving step, the step of:

filtering the effluent stream to remove insoluble materials, at least some of which are contaminated.

3. The method of claim 1 wherein the discharging step includes:

precipitating the plastic from the effluent stream.

4. The method of claim 1 wherein the dissolving step includes the step of:

heating the aqueous solvent to enhance the rate of dissolution.

5. The method of claim wherein said dissolving step includes:

using sodium hydroxide as the aqueous solvent.

6. The method of claim wherein the dissolving step includes:

using a caustic solvent as the aqueous solvent.

7. The method of claim 2 including the step of:

adjusting the pH of the effluent stream after the filtration step.

8. The method of claim 3 wherein said precipitating step includes:

providing an acidic regime in order to precipitate the plastic material out of the effluent stream.

9. The method of claim 3 including the steps of:

dewatering the precipitated plastic material; and drying the plastic material.

10. The method of claim 1 including the preparatory steps of:

separating plastic materials that can be dissolved in an aqueous solution from plastic materials that cannot be dissolved in an aqueous solution;

shredding the dissolvable plastic materials; and washing the shredded dissolvable plastic materials with a washing solution to remove loosely attached soluble and insoluble materials, at least some of which can be radioactively contaminated, from the plastic materials.

11. The method of claim 10 wherein the washing step includes:

using a neutral solution to wash the shredded plastic material.

12. The method of claim 10 wherein the washing step includes:

using an acidic solution to wash the shredded soluble plastic materials.

13. The method of claim 8 including the step of providing for a dewatering step to separate out the loosely attached soluble and insoluble materials from the washing solution;

disposing of the soluble and insoluble materials;

discharging washing solution.

14. The method of claim 3 wherein hydrochloric acid is used in the precipitation step to precipitate the plastic material from solution.

15. The method of claim 1 including the step of:

providing identifying markings on the plastic material which is dissolvable in an aqueous solvent such the plastic material can be segregated from other types of materials for processing.

16. The method of claim 1 including the step of:

using a 4:1 copolymer of ethyl acrylate and methacrylic acid as the plastic material.

17. The method of claim 1 including the step of: using a 3:1 copolymer of ethyl acrylate and methacrylic acid as the plastic material.

18. The method of claim 1 including the step of: using a 2:1 copolymer of ethyl acrylate and methacrylic acid as the plastic material.

19. The method of claim 1 including the step of: using a 3:2 copolymer of ethyl acrylate and methacrylic acid as the plastic material.

20. A method for disposing of plastic materials formed into articles for use in an environment having radioactive materials and contaminants, which plastic materials have become radioactively contaminated due to exposure in the such environment, comprising the steps of:

selecting as the plastic materials a copolymer of ethyl acrylate and methacrylic acid;

dissolving the plastic materials in an aqueous solvent to produce an effluent stream;

providing for, selectively using one of an ion exchange and an adsorption step whereby the soluble materials, at least some of which are radioactively contaminated, are removed from the effluent stream;

disposing of the soluble materials as radioactively contaminated materials;

discharging the effluent stream selectively by one of reusing the plastic materials and disposing of the plastic materials as non-radioactive contaminated waste.

21. The method of claim 20, after the dissolve step, the step of:

filtering the effluent stream to remove insoluble materials, at least some of which are contaminated.

22. The method of claim 20 wherein the discharging step includes:

precipitating the plastic from the effluent stream.

23. The method of claim 21 including the step of: adjusting the pH of the effluent stream after the filtration step.

24. The method of claim 22 wherein said precipitating step includes:

providing an acidic regime in order to precipitate the plastic material out of the effluent stream.

25. A method for disposing of plastic materials formed into articles for use in an environment having radioactive materials and contaminants, which plastic materials have become radioactively contaminated due to exposure in such environment, comprising the steps of:

selecting as the plastic materials a polymer of an unsaturated organic acid;

dissolving the plastic materials in an aqueous solvent to produce an effluent stream;

providing for, selectively using one of an ion exchange and an adsorption step whereby the soluble materials, at least some of which are radioactively contaminated, are removed from the effluent stream;

disposing of the soluble materials as radioactively contaminated materials;

discharging the effluent stream selectively by one of reusing the plastic materials and disposing of the plastic materials as non-radioactive contaminated waste.

26. A method for disposing of plastic materials formed into articles for use in an environment having radioactive materials and contaminants, which plastic materials have become radioactively contaminated due to exposure in such environment, comprising the steps of:

selecting as the plastic materials a terpolymer of an unsaturated orgnanic acid;

dissolving the plastic materials in an aqueous solvent to produce an effluent stream;

providing for, selectively using one of an ion exchange and an adsorption step whereby the soluble materials, at least some of which are radioactively contaminated, are removed from the effluent stream;

disposing of the soluble materials as radioactively contaminated materials;

discharging the effluent stream selectively by one of reusing the plastic materials and disposing of the plastic materials as non-radioactive contaminated waste.

27. A method for disposing of plastic materials formed into articles for use in an environment having radioactive materials and contaminants, which plastic materials have become radioactively contaminated due to exposure in such environment, comprising the steps of:

selecting as the plastic materials a plastic made of polyvinylalcohol (PVOH);

dissolving the plastic materials in an aqueous solvent to produce an effluent stream;

providing for, selectively using one of an ion exchange and an adsorption step whereby the soluble materials, at least some of which are radioactively contaminated, are removed from the effluent stream;

disposing of the soluble materials as radioactively contaminated materials;

discharging the effluent stream selectively by one of reusing the plastic materials and disposing of the plastic materials as non-radioactive contaminated waste.

28. A method for disposing of plastic materials formed into articles for use in an environment having radioactive materials and contaminants, which plastic materials have become radioactively contaminated due to exposure in such environment, comprising the steps of:

selecting as the plastic materials a material from the group consisting of copolymers of acrylic acid, methacrylic acid and maleic acid anhydride;

dissolving the plastic materials in an aqueous solvent to produce an effluent stream;

providing for, selectively using one of an ion exchange and an adsorption step whereby the soluble materials, at least some of which are radioactively contaminated, are removed from the effluent stream;

disposing of the soluble materials as radioactively contaminated materials;

discharging the effluent stream selectively by one of reusing the plastic materials and disposing of the plastic materials as non-radioactivity contaminated waste.

* * * * *